United States Patent [19]
Sarukkai et al.

[11] Patent Number: 5,819,220
[45] Date of Patent: Oct. 6, 1998

[54] WEB TRIGGERED WORD SET BOOSTING FOR SPEECH INTERFACES TO THE WORLD WIDE WEB

[75] Inventors: Ramesh Sarukkai, Cambridge, Mass.; Sekhar Sarukkai, Sunnyvale, Calif.

[73] Assignee: Hewlett-Packard Company, Palo Alto, Calif.

[21] Appl. No.: 722,691

[22] Filed: Sep. 30, 1996

[51] Int. Cl.$^6$ ..................................................... B01L 5/06
[52] U.S. Cl. ........................... 704/243; 704/270; 704/340; 395/12
[58] Field of Search ............................ 395/762; 704/270, 704/240, 243

[56] References Cited

U.S. PATENT DOCUMENTS

| | | | |
|---|---|---|---|
| 4,653,045 | 3/1987 | Stanley | 379/203 |
| 4,691,347 | 9/1987 | Stanley | 379/203 |
| 5,086,385 | 2/1992 | Launey | 364/188 |
| 5,384,892 | 1/1995 | Strong | 704/243 |
| 5,390,279 | 2/1995 | Strong | 704/243 |
| 5,572,643 | 11/1996 | Judson | 395/762 |
| 5,613,036 | 3/1997 | Strong | 704/243 |
| 5,621,859 | 4/1997 | Shewartz | 704/256 |
| 5,651,096 | 7/1997 | Pallakof | 704/275 |
| 5,673,322 | 9/1997 | Pepe | 395/762 |

OTHER PUBLICATIONS

Hemphill, Speech–Aware Multimedia, Texas Instrument, Sep. 1996.

Hemphill, Surfing the Web by Voice, Texas Instrument, Nov. 1995.

Novell, Just Browsing, Dec. 1995.

Hemphill, Charles T. and Thrift, Philip R., "Surfing the Web by Voice," *Proceedings of the ACM,* Multimedia '95, Nov. 5–9, 1995, San Francisco, California.

Huang, Xuedong; Alleva, Fileno; Ho, Hsiao–Wuen; Hwang, Mei–Yuh; Lee, Kai–Fu; and Rosenfeld, Ronald, "The SPHINX–II Speech Recognition System: an overview," *Computer Speech and Language* (1993), 2, 137–148, Academic Press Limited, 1993.

Huang, X; Belin, M.; Alleva, F.; and Hwang, M., Unified Stochastic Engine (USA) for Speech Recognition, Proc. of International Conference on Acoustic, Speech, and Signal Processing, 1993, pp. 636–639, IEEE 1993.

Bahl, Lalit R.; Brown, Peter F.; de Souza, Peter V., and Mercer, Robert L., "Estimating Hidden Markov Model Parameters So As To Maximize Speech Recognition Accuracy", IEEE Trans. on Speech and Audio Processing, vol. 1, No. 1, pp.77–83, Jan.1993.

Sarukkai, Ramesh R. and Ballard, Dana H., "Word Set Probability Boosting for Improved Spontaneous Dialogue Recognition: The AB/TAB Algorithms'," Technical Report, University of Rochester URCSTR 601, Dept. of Computer Science, Univ. of Rochester, Dec. 1995.

*Primary Examiner*—David R. Hudspeth
*Assistant Examiner*—Daniel Abebe
*Attorney, Agent, or Firm*—Marger, Johnson, McCollom & Stolowitz, P.C.

[57] ABSTRACT

A computer system for user speech actuation of access to stored information, the system including a central processing unit, a memory and a user input/output interface including a microphone for input of user speech utterances and audible sound signal processing circuitry, and a file system for accessing and storing information in the memory of the computer. A speech recognition processor operating on the computer system recognizes words based on the input speech utterances of the user in accordance with a set of language/acoustic model and speech recognition search parameters. Software running on the CPU scans a document accessed by a web browser to form a web triggered word set from a selected subset of information in the document. The language/acoustic model and speech recognition search parameters are modified dynamically using the web triggered word set, and used by the speech recognition processor for generating a word string for input to the browser to initiate a change in the information accessed.

12 Claims, 2 Drawing Sheets

WEB TRIGGERED WORD SET BOOSTING FOR SPEECH INTERFACES TO THE WORLD WIDE WEB

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention relates to a system and method for accessing information via the internet, and more particularly to a speech interface to information resources on the World Wide Web (WWW).

A dominant theme of many new companies has been software related to information access on the internet, as evidenced by immense posturing and positioning of almost all major computer companies in the arena of internet. One of the critical components of this explosion in interest directly relates to the interaction of the user with the internet information resources. A few approaches including web surfing using browsers, web crawlers and search engines as the most common means of accessing this internet-wide information infrastructure.

The increase in the number of users, the number of servers, the volume of data transferred and the increasing advertising dollars spent on the internet will only fuel larger growth of the internet. It is hoped that this road will eventually lead to a society in which internet access by common-folk at homes, becomes as pervasive and easy to use as a TV or telephone. A number of technologies are already gaining momentum in making the dream of providing internet access at homes a reality. However, one of the real problems in using this technology is the not-so-seamless nature of the computer, and perhaps more importantly, the human-computer interface. One essential component to make internet access as seamless and as easy to use as a TV-remote is the capability to use speech commands to navigate, query and search the cyberspace. If nothing else, this capability will at least eliminate the need to use a keyboard/mouse interface.

Very recently, a few companies have actively tried to provide quick speech access to the web, with mixed success. Building a speech recognition system as an interface to the World Wide Web is a very different problem from those previously encountered in other speech recognition domains, such as read or spontaneous speech. The primary problem is huge vocabularies: the user can virtually access any document on the internet, about any topic. One way of reducing the vocabulary problem is by having "smart speech recognizers" (such as the one described in this document). The Out-Of-Vocabulary (OOV) problem is another serious difficulty in using speech interfaces for web navigation. Lack of sequential word context is yet another important issue where traditional n-gram language models fail.

Issues in Web Surfing with Speech

Described below are some of the most common issues related to having a general speech interface to the WWW:

Out-Of-Vocabulary Words

Properly dealing with unknown words is an unsolved problem in continuous speech recognition. Even with very large vocabularies, a proper method of handling out-of-vocabulary (OOV) words is not available. In the context of web surfing, it becomes even more prominent. This is due to the increased use of abbreviations, short-forms, proper names, and virtually unlimited vocabulary access. One simple solution is to cater the links (i.e. by renaming) to speech recognition engine vocabularies. Even so, speech recognition accuracies with state-of-art technologies are not good enough, mainly due to the absence of (language modeling) context in link names (or link referents), for use with very large vocabulary systems. It is necessary to get the in-vocabulary words correct even in the presence of OOV words.

On-the-fly Pronunciation Generation

Unlike continuous speech recognition systems, there is accessible information about the vocabulary for applications such as web surfing; for instance, the web links that are being spoken are accessible through the contents of the web page currently being viewed. Such information can be utilized to improve speech recognition performance. Since one has access to the list of words that are present in the presently viewed page, the system can determine which words are OOV words. It is important to note that the letter spelling of (some of) the OOV words are available: using letter to phoneme mappings, the phonemic transcription of such OOV words can be generated, and utilized in decoding the uttered speech signal. This is commonly referred to as on-the-fly pronunciation generation, and still an area of active research.

Language Models

The use of language models has profoundly improved the performance of continuous speech recognition systems on various tasks. However, language modeling is a very difficult issue for web surfing. For certain problems which require interactive dialogue with the system, traditional n-gram language models may help: however, in many cases, the speakable links are short sequences of words that do not frequently occur in a large textual corpus (including web pages) that is used to make the language models. Static language modeling is a weak component for web surfing applications of speech recognition systems. Issues relating to dynamic language models such as on-the-fly grammar generators are discussed in the Summary of the Invention below.

Prior Art Attempts at Speech-Actuated Web Access Enumerating Links

A simple method of addressing the problem of web access using speech is to enumerate all the links in a page, and have the user read out the number of the link in order to access it. This is the approach taken in the beta version of Kolvox's Voice companion to the internet. Clearly, this is an unnatural way of accessing the web, and fails for html documents such as forms, and search engines.

Dynamic RGDAG

Texas Instruments is developing a speech interface for the WWW, using a Directed Acyclic Graph (DAG) of probabilistic regular grammars (RGs) to constrain the recognition search. See Charles T. Hemphill and Philip R. Thrift, "Surfing the Web by Voice", in *Proceedings of the ACM,* Multi-Media '95. Whenever a new page is accessed, the corresponding RGDAG is created and used for constraining the speech recognition search. This is extended to the notion of smart pages which contain a reference to a grammar that interprets the result of that grammar.

RGDAGs are unfavorable for use in speech recognition systems for several reasons. First, building RGDAGS dynamically involves a lot of computation overhead.

Second, it is well-known that restarts, and mid-utterance corrections are a common feature of spontaneous speech, and are very difficult, if not impossible to model correctly with Directed Acyclic Graphs (DAG) of probabilistic regular grammars (RGs). Thus, if word repetitions are not explicitly modeled, then the TI system would fail for the following utterance:

GOTO THE <pause> THE C S HOME PAGE

The link in the above example is GOTO THE C S HOME PAGE.

The second example where the TI system fails in its present form is when known words are spoken, although they are not present in the link referent. Assuming a static lexicon which includes the word CITY, and assuming that the link word sequence is exactly the SAN FRANCISCO MAP, then a system based on RGDAG would fail (due to the insertion of CITY) when the user utters the following:

THE SAN FRANCISCO CITY MAP

When out-of-vocabulary (OOV) words are embedded in known words, the RGDAG approach typically fails to recover the correct in-vocabulary words. For instance, if the word PRICE is absent from the vocabulary, and the only link in the page is called THE CURRENT STOCK QUOTES, then the RGDAG method would fail for the following utterance:

THE CURRENT STOCK PRICE QUOTES

It is infeasible to build RGDAGs characterizing very large vocabulary spontaneous speech. Accordingly, a need remains for a better form of speech interface to a computer, in particular, one that is adapted to the broad vocabulary encountered on the World Wide Web, but able to respond to short speakable sequences of words not necessarily found in the large textual base of web pages and other Web-accessed documents.

SUMMARY OF THE INVENTION

Our approach is to employ statistical n-gram based grammars which are in vogue. Typically n-grams allow the notion of looser constraints be incorporated into the search process when contrasted with RGDAGs. While n-grams do not impose strict word sequence constraints, the problem is that they are usually statically trained on a fixed set of text corpus.

In the context of speech interfaces to the web, the invention dynamically makes use of information provided by links in a document or in the current page of a source document being viewed (and recently viewed pages). To our knowledge, nobody has proposed the concept of dynamically altering language model scores (such as n-gram) and acoustic model scores using a web-triggered word set.

In the most straightforward implementation, the document is an HTML source document containing hypertext links, which are used in the present invention to identify the word set to be included in the final word set for probability boosting the word recognition search. The links are not limited to hypertext links, however, and the word set can be augmented in several ways: by adding pre-specified function and command words; by adding text words from the current page and other text words such as keyword identified in the document; and the like.

The actual modification of the language model and acoustic model scores can be implemented in a variety of methods, and the formulation presented in the Detailed Description is general and includes methods such as word set probability boosting, and dynamically altering language model probabilities using word set information.

The foregoing and other objects, features and advantages of the invention will become more readily apparent from the following detailed description of a preferred embodiment of the invention which proceeds with reference to the accompanying drawings.

APPENDIX 1 is a listing of pertinent portions of code for a web-triggered HTML link extractor for use in implementing the present invention.

APPENDIX 2 is a listing of pertinent portions of code for modifications to a conventional speech recognition program to integrate web-triggered word set boosting into the recognition process.

APPENDIX 3 is a listing of a Web browser display updating program in accordance with invention.

DETAILED DESCRIPTION

Web Triggers Concept

Based on the above discussions, it should be clear that a mechanism for utilizing very large vocabulary systems, while biasing the search towards Web page dependent knowledge, is needed. The invention uses a word set mechanism to incorporate biases towards certain trigger-specific information.

Acoustic and language scores are usually computed separately in most speech recognition systems. Language models are derived off-line using a large text corpus, and acoustic models are optimized using lower level criteria (such as phonetic transcription accuracy). Furthermore, the two scores have to be combined in some manner. Bayes rule is applied in most continuous speech recognition systems to find the most likely word sequence.

Typically, during the search for the "optimal" word sequence, an evaluation function is used in all speech recognizers. If W is a word sequence, given the acoustic observation X, then a combined estimate of the "goodness" of a possible word sequence has the following general form:

$$F(S_{LM}(W), S_{AC}(X|W)) \tag{1}$$

Figure 1:
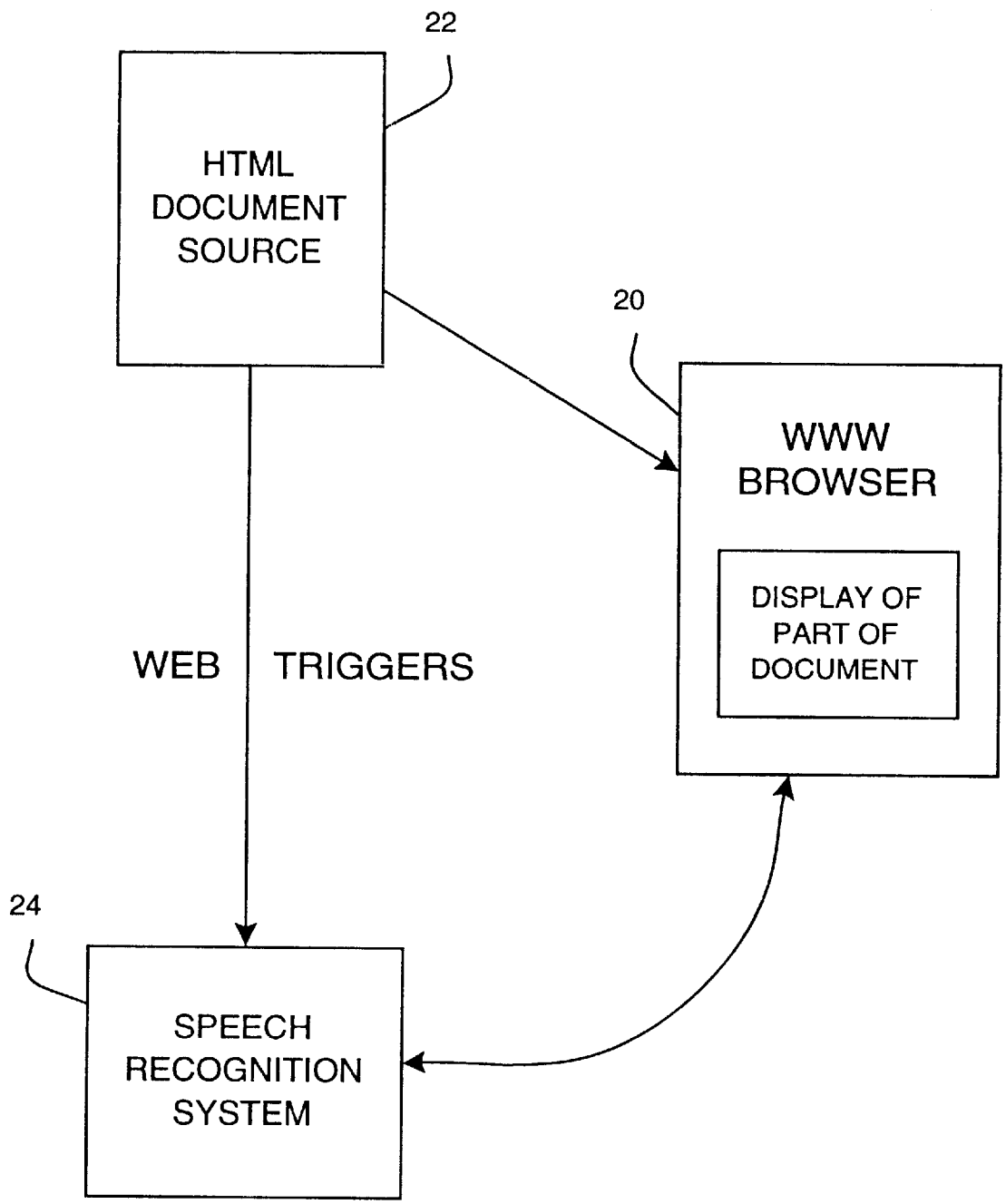
FIG. 1 is a diagram of an overview of the Web trigger concept for speech interfaces to the World-Wide Web according to the invention.

$S_{LM}$ is referred to as the language model score, and $S_{AC}$ is called the acoustic model score. In the context of speech interfaces to the World Wide Web, we redefine the above equation as follows:

$$F(S_{LM}(W|H), S_{AC}(X|W, H)) \quad (2)$$

where H is the web triggered word set, F is a function that combines the acoustic and language model scores in some form. Thus, the set of words that are present in the web page (or that specify links) currently being viewed can be treated as a word set that is triggered by the web page. The term "web triggers" is coined to indicated such a relationship. The speech recognition system biases its search towards this set of web triggers by modifying the language model and/or acoustic model scores using the web triggered word set information. This is illustrated in FIG. 1. The web triggered word set is in essence a special vocabulary that varies dynamically.

Rather than stress the rigid sequential constraints that RGDAGS enforce, the web-triggered word set approach enables biasing the search for the "best" word sequence process towards the set of words which is dynamically produced depending on the web page sources of the web pages recently viewed. This word set biasing is achieved by incorporating the web-triggered word set as an additional piece of information in computing the speech recognition scores for the different word paths/sequences.

The actual integration of the dynamic adaptation of the web page context information can be performed in many ways. One method that was utilized in the current working example is word set probability boosting by adapting/modifying word dependant language model weights, as described below in the section on Implementation.

Figure 2:
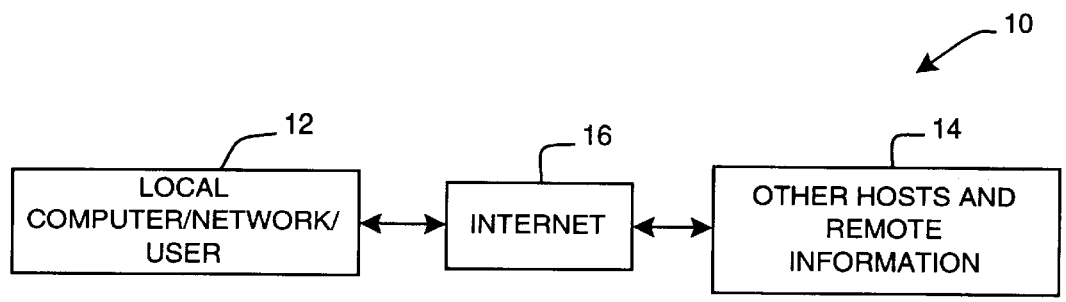
FIG. 2 is a block diagram of a system implementing the invention of FIG. 1.

The organization of a system 10 implementing the invention can be quite general as depicted in FIG. 2. At one end is the user with a local computer/LAN 12 (note that the user is symmetric in the sense that he/she could be anywhere in the network) and is connected to other remote servers/LANs/Machines/Users 14 through a wide area network 16 like the INTERNET. The goal of such a connection is to maximize information communication between these various users/systems. The invention can also be implemented and used within a local area network or just on the user's computer.

In the context of this invention, the user (depicted here at the local machine 12 will be using speech input via microphone and digital signal processing (DSP) as an interface to access the information on computer(s) 14 across the network 16. The user interacts with the local machine with the same interface as always (a netscape/mosaic web browser) depicted as WWW Browser 20 in FIG. 1. The only constraint in our implementation is that the client browser 20 can interpret html documents 22, and can execute java applets. In order to move from the current page to a different one, the user simply voices the highlighted words of the http link of interest.

For the purpose of the presented algorithm, the actual speech recognition process (system 24 in FIG. 1) can occur anywhere in the network, so long as it is fast enough and can access the digital speech samples of the user's speech and can control what information is displayed to the local user.

In the experiments described below, the speech recognition system was running on a SUN SPARC10 workstation connected through a gateway server to the INTERNET using Netscape or any other Java-compatible WWW browser. The speech recognition software is a University of Rochester version of SPHINX-II, a publicly available program written on top of Carnegie-Mellon University's Sphinx-II, as described in "An Overview of the SPHINX-II Speech Recognition System", Xuedong Huang, Fileno Alleva, Mei-Yuh Hwang, and Ronald Rosenfeld, ARPA '93, with the addition of the web triggered word boosting in accordance with the present invention. The user voice utterances are input via a conventional microphone and voice input and sampling interface to the computer. The CS department homepage at University of Rochester and some personal home pages were used as example documents that could be navigated using speech triggers. Some other versions which ran on remote machines were also experimented with.

Description of Speech Recognition Process
Initialization
   0) Set initial web page context to be last remote/locally accessed html page in the web trigger generator of Appendix 1, in the speech recognition program mods of Appendix 2, and in the web-triggered HTML extractor program in Appendix 3.

Figure 3:
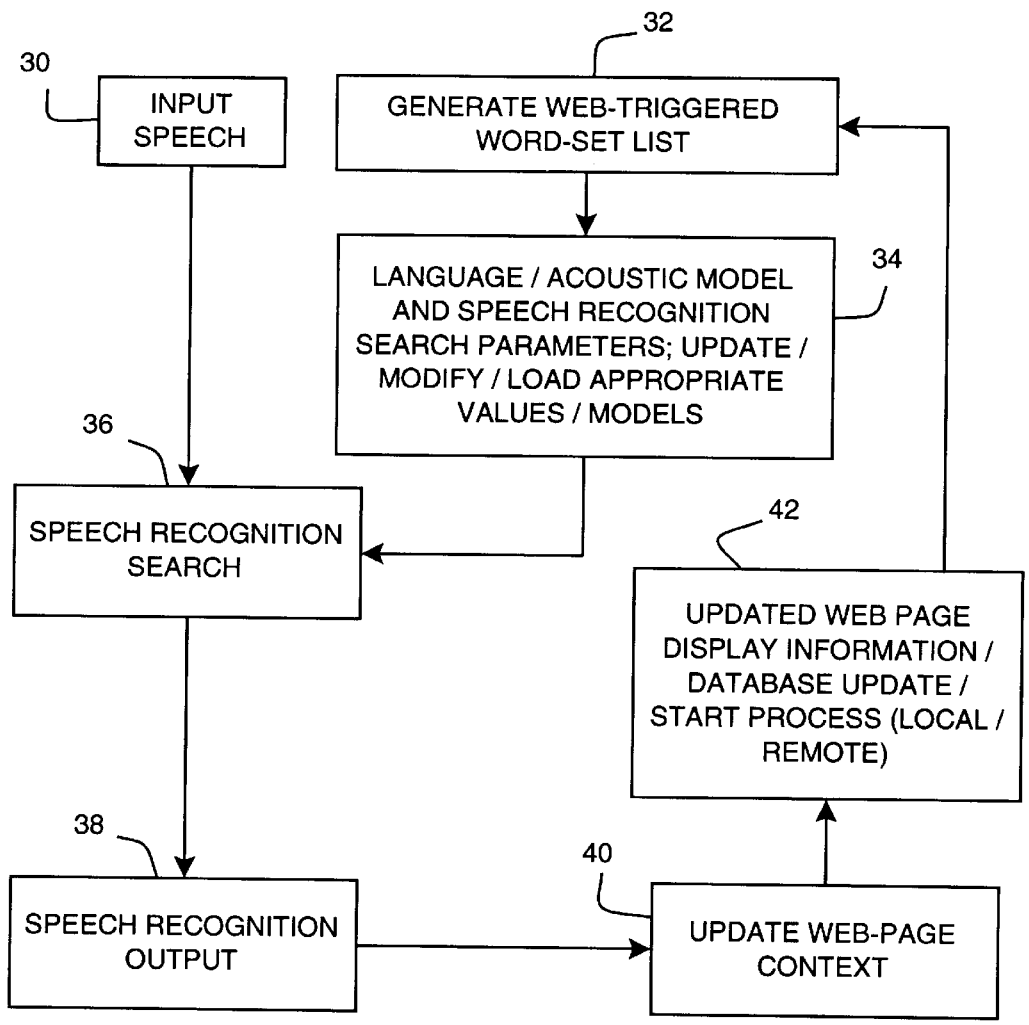
FIG. 3 is a flowchart of the speech recognition process employed in the system of FIGS. 1 and 2.

Referring to FIG. 3, for each utterance, do the following steps:

1) Process input speech (step 30) using standard preprocessing and parameterization techniques of speech input.

2) Depending on the source of the currently viewed HTML document and selected web-triggered word-set list developed in step 32: (NOTE: This assumes that a remote/local source has been or can be accessed through the network.)

3) Modify the appropriate language Model and/or acoustic model parameters dynamically in step 34, using the selected word-set list (see step 32), to be used during the speech recognition search process. See Appendix 2.

4) Perform the actual speech recognition process (step 36) by using the parameters chosen dynamically (step 34) depending on the web page context.

5) Depending on the speech recognition search output (step 38), update the information for feedback to the user (such as loading a new HTML page) or performing an action (such as updating a database, or executing a remote/local program) as shown in steps 40 and 42. The actual process of updating the Web Browser display is shown in Appendix 3. The actual process of updating the web-triggered word set is partially done in Appendix 1 and augmented as desired by the user.

6) Process next utterance (return to step 1).

In the current implementation, the web browser 20 loads a particular HTML source document 22, which starts up a looping JAVA applet (the source of such a sample program is given in Appendix 3 and titled KeepLoading.java). What this JAVA program does is just to keep accessing a particular page which is stored in a file accessible (readable) by both the WVW Browser 20 and readable and modifiable by the Speech Recognition System 24. This file is typically stored on the local computer but can be remote as long as it is accessible by both WWW Browser 20 and Speech Recognition System 24. This file is constantly updated by the speech recognition system depending on the recognition result of the local users speech. It is constantly polled by the JAVA program listed below. In the current version, the speech recognizer is given information such as the list of links and corresponding word sequences which it utilizes in conjunction with the invention in order to recognize the speech, and updates the output HTML document location if necessary.

A simple version of the html document that has to be loaded in order to execute the looping JAVA program of Appendix 3 is described in the following example.

Example

As an example, assume that the user is currently viewing the home page of the Univ. of Rochester Computer Science Department. Using a simple JAVA program, such as the example listed in Appendix 3, the currently viewed page can be automatically accessed, and a Link-Referent table created as shown (see Table 1 for some examples).

The information shown in the table was extracted automatically by a simple parsing JAVA program shown in Appendix 1. The set of words constituting the link referent can constitute a web triggered word set, and it would make sense to bias the speech recognition search towards this set of words since it is likely that the user will utter them. This web triggered word set can be supplemented with additional command words, function words, and even other triggered words that are commonly used in conjunction with them (e.g., utterance triggers of web triggered words).

Thus, the source word set of web triggered word set, for this example, would consist of {BACK, HOME, C, S, U, OF, R, DEPARTMENT, BROCHURE, TECHNICAL, REPORT,COLLECTION, ANONYMOUS, F, T, P, ARCHIVE, SUBWAY, MAP, RESEARCH, PROJECTS, COURSE, INFORMATION, APPLICATION, GRADUATE, STUDY, UNDERGRADUATE, PROGRAM, REPORTS, DIRECTIONS, TO }.

TABLE 1

Link Referents and addresses

| Link | Referent |
|---|---|
| http://www.cs.rochester.edu/u/sarukkai/ | BACK |
| http://www.cs.rochester.edu/u/sarukkaii/home.html | HOME |
| http://www.cs.rochester.edu/ | U OF RCS |
| http://www.cs.rochester.edu/brochure/ | DEPARTMENT BROCHURE |
| http://www.cs.rochester.edu/trs/ | TECHNICAL REPORT COLLECTION |
| ftp://ftp.cs.rochester.edu/pub | ANONYMOUS FTP ARCHIVE |
| http://www.cs.rochester.edu/subway/ | DEPARTMENT SUBWAY MAP |
| http://www.cs.rochester.edu/users/ | DEPARTMENT PEOPLE |
| http://www.cs .rochester.edu/subway/ | DEPARTMENT SUBWAY MAP |
| http://www.cs.rochester.edu/research/ | DEPARTMENT RESEARCH PROJECTS |
| http://www.cs.rochester.edu/courses/ | COURSE INFORMATION |
| http://www.cs.rochester.edu/admit/ | APPLICATION FOR GRADUATE STUDY |
| http://www.cs.rochester.edu/undergrad/ | UNDERGRADUATE PROGRAM |
| http://www.cs.rochester.edu/trs/ | TECHNICAL REPORTS |
| http://www.cs.rochester.edu/directions/ | DIRECTIONS TO URCS |

Thus, the web-triggered word set H can consist of the following:

A basic set of command and function words chosen a priori. This word set is referred to as the basic word set.

A set of words selectively extracted from the web page source that is being currently displayed by the browser. This is referred to as the source word set.

A set of words "related" to or "triggered" by the source word set.

A short-term caching which facilitates keeping around recently formed web triggered word sets.

Implementation

The actual implementation of equation (2) can be done in numerous methods. For example, one method would be to apply word set boosting, and boost the language model scores for a selective set of words. In this case, the word set is a function of the web page being accessed.

When combining acoustic and language model scores in a Bayesian fashion, the language model and acoustic model probability products should be viewed as scores rather than probabilities. In practice, however, since the sources of information are very different, and the true probability distributions cannot be accurately estimated, the straightforward application of Bayes rule will not lead to a satisfactory recognition performance. Therefore, it is common to weight the acoustic and language model scores separately so as to optimize performance on some held-out training data. The language weights may also be tuned using actual acoustic and language model scores in a unified stochastic model as was demonstrated by "Unified Stochastic Engine (USE) for Speech Recognition", Huang, Belin, Alleva, and Hwang, Proc. of ICASSP'93, pp:636–639.

Bahl et al. in "Estimating Hidden Markov Model Parameters So As To Maximize Speech Recognition Accuracy", Lalit R. Bahl, Peter F. Brown, Peter V. de Souza, and Robert L. Mercer, IEEE Trans. on Speech and Audio Processing, vol. 1, no. 1, pp:77–83, January 1993, have explored the idea of estimating Hidden Markov Model parameters so as to maximize speech recognition accuracy using an acoustically confusable list of words.

Interpreting the language model weights as "boosting" values enables the formulation of utterance specific triggering effects in dialogues so as to improve speech recognition accuracy. In addition, an adaptive algorithm for tuning these word dependent language model weights is given in "Word Set Probability Boosting for Improved Spontaneous Dialogue Recognition", Ramesh R. Sarukkai and Dana H. Ballard, published as a Technical Report at University of Rochester entitled "Word Set Probability Boosting Using Utterance and Dialog Triggers for Improved Spontaneous Dialogue Recognition: The AB/TAB Algorithms", Ramesh R. Sarukkai and Dana H. Ballard, URCSTR 601, Dept. of Computer Science, Univ.of Rochester, December 1995 and to appear in IEEE Transactions on Speech and Audio Processing.

The word set boosting framework extends the above concepts in the following manner. First, let us assume there is some a priori information which enables us to predict a set of words H for the particular speech utterance in consideration. The altered Bayes-like scoring function to minimize is now $$Pr(X|W) \times Pr(W)^{Omega(W,H)} \quad (3)$$

There is a special set of Omega(W,H) values for words W belonging to the predicted/web-triggered set H, so as to improve the scores of such words. There are other values of Omega for words not belonging to the set H and thus the scores are possibly attenuated. Omega(W,H) is a word-dependent factor and essentially the Language model "probability" is raised to the power of Omega(W) in the modified algorithm. The vector Omega is termed as the word boosting vector.

Now in the context of web triggered word set boosting, the idea is to simply assign a value for Omega such that words that are "predicted/expected" using the Web page context (including the HTML source) are scored better than the rest of the words during the search process, and therefore are more likely to show up in the best word sequence.

Thus, the language model scores of every word present in the predicted word set, are boosted (improved) by the corresponding factor during the search process. Similarly, words that are absent from the predicted word set are assigned another appropriate Omega(W) (so as to typically diminish/attenuate their effective scores).

The concept of extracting web-triggered word set information depending on the context of the web pages recently viewed can also be implemented in other methods. One method would be to appropriately smooth/re-estimate n-gram language model scores using the HTML sources of the documents recently viewed. Another would be to appropriately modify/weight acoustic model parameters.

Experimental Result

Using Carnegie-Mellon University's Sphinx-II system as the baseline, and applying the word boosting concept using web triggers, a series of page access experiments were performed using mostly local home pages. The speech recognizer lexicon consisted of 1728 words, and a bigram language model was constructed using ATIS and Trains93 corpus.

The link words are accessed using the source of the hypertext markup language (HTML) document currently being viewed. The speech recognizer then boosts the probability of these web triggered word sets, while determining the best word sequence. This word sequence is then matched with the stored word sequences corresponding to all the links possible from the currently viewed HTML document, in order to determine the next best link to take. The recognized words should match at least 30% of the link words correctly in order to be valid. The results shown in the table 2 are derived from 126 utterances for accessing links across various pages.

TABLE 2

% Correct page access with and without web trigger word set boosting

| Method | % Correct Page Access |
| --- | --- |
| Benchmark | 44.44% |
| Web Triggered Word Sets | 75.93% |

Instances where web triggered word sets help dramatically are letter sequences such as "U of R C S Department", and links which include out of vocabulary words. The word boosting approach is able to recover some of the correct words and thus improve page access performance.

To summarize, web-triggers addresses many of the previously presented issues. These advantages are enumerated below.

Building grammars dynamically involves a lot of computation overhead. The web-trigger approach does not dynamically vary the vocabularies. The web triggered word set boosting just selectively alters the "scores" that are assigned to the different words, treating the web triggered word sets differently.

Exact word sequence grammars are too restrictive: for example, repeating a word would throw the grammar parsing speech recognition system off unless the repetition was explicitly modeled. Since the selective web triggered word set probability boosting just biases the speech recognition search towards a specific subset of the vocabulary, word sequencing and restarts can be handled well. Of course, the web triggered word set boosting approach is built on top of a language model, typically an n-gram.

The grammar models degrade ungracefully in the presence of OOV words. In contrast, even in the presence of OOV words, since the probabilities of individual words belonging to the web triggered word set are boosted, the web-triggering approach enables many of the correct words to be recovered even when OOV words are present.

It is infeasible to build grammars for very large vocabulary spontaneous speech. The alternative language models in vogue are n-grams, and the web triggered word set approach easily caters to integration with n-grams in order to improve speech recognition accuracies.

The concept of the present invention can be enhanced in number of ways. One way is to provide a caching process that will save the web triggered word sets for recently viewed documents so that the user can more readily re-access a selected one of those documents. For example, by saving the name and keywords of a document that has just been accessed the user can return to it simply by saying "Go back to (name of document or other descriptor)." Such a cache would implemented by saving a number of the previous word set lists and assigning a weighting value to each according to its recency, or frequency of access, or other suitable weighting factors.

Having described and illustrated the principles of the invention in a preferred embodiment thereof, it should be apparent that the invention can be modified in arrangement and detail without departing from such principles. We claim all modifications and variation coming within the spirit and scope of the following claims.

APPENDIX 1: Web-Triggered HTML Link Extractor: JAVA source code
*******************************************************************
Brief Description of the following JAVA class LoadPage::

The following JAVA program essentially keeps polling the file
"http://www.cs.rochester.edu/u/sarukkai/WordLabel.html" which is
constantly updated by the speech recognition system depending on the
speech input recognition result.
If the contents of the above mentioned file has been altered, then
the JAVA program LoadPage accesses this new URL page (flags an error
if invalid or not present). Then the appropriate link words (termed
referants) and the corresponding HTML addresses are extracted from
the accessed HTML source and stored in local files "page.Address"
and "page.Referent". The "page.Address" and "page.Referent" files are
in turn accessed by the speech recognition system and used to
make the word sets which are boosted or scored appropriately.
NOTE: The following JAVA program also keeps running in addition
to the speech recognition system and the other looping JAVA program
(see KeepLoading).
--------------------------------------------------------------------

```java
import java.net.*;
import java.io.*;

class LoadPage {
  public static void main(String args[]) {

// Initialize
        DataInputStream dis=null, currpage=null;
        String thisInputLine,inputLine,
            link="" , oldlink="",
            linkAddress="",ReferenceString="",HeadAddress="";
        int startAdd,endAdd;

URL mypage=null;

// Keep Looping
        while (true)
        {
            try {
                mypage = new
URL("http://www.cs.rochester.edu/u/sarukkai/WordLabel.html");
            }
```

```
        catch (MalformedURLException me) {
             System.out.println("MalformedURLException: " + me); } try { currpage = new DataInputStream(mypage.openStream()); }
        catch (IOException ioe) {
             System.out.println("IOException: " + ioe);
           } try {link = currpage.readLine(); }
        catch (IOException ioe) {
             System.out.println("IOException: " + ioe);
           }

// Check to see if the link address has changed
        // or has been updated by the speech recognition system.
        if (!link.equals(oldlink))
        {
        // Access the new HTML document and process to extract
information
        try {
             URL yahoo = new URL(link);
             HeadAddress = link.substring(0,link.lastIndexOf("/")+1);

if (oldlink.equals("")) oldlink=link;
             FileOutputStream fout= new
FileOutputStream("page.Address");
             PrintStream myout = new PrintStream(fout);
             FileOutputStream fout2= new
FileOutputStream("page.Referent");
             PrintStream myout2 = new PrintStream(fout2);

myout.println(oldlink);

// Add some simple keywords; can also be appended by
             // speech recognition system
             myout2.println("BACK #");

myout.println("http://www.cs.rochester.edu/u/sarukkai/home.html");
             myout2.println("HOME #");
             myout.println("http://www.cs.rochester.edu/");
             myout2.println(" U of R C S #");

dis = new DataInputStream(yahoo.openStream());
             thisInputLine="";
```

20

```
while ((inputLine = dis.readLine()) != null) {
    System.out.println(inputLine);
    if (inputLine.indexOf("<area")!=-1) continue;
    if (inputLine.indexOf("<img")!=-1) continue;

// possible link reference
    if (inputLine.indexOf("HREF=\"")!=-1)
    {
        startAdd=inputLine.indexOf("HREF=\"");

linkAddress=inputLine.substring(startAdd+6,inputLine.indexOf("\">",startAdd+1));
        if ( (linkAddress.indexOf("://")==-1) && (linkAddress.indexOf("mailto:")==-1) )
            linkAddress = HeadAddress.concat(linkAddress);
        System.out.println(linkAddress);
        if (inputLine.indexOf("</A>")!=-1)
        {

ReferenceString=inputLine.substring(inputLine.lastIndexOf(">",inputLine.lastIndexOf("</A>")-1)+1,inputLine.indexOf("</A>"));
            System.out.println(ReferenceString);
            ReferenceString = ReferenceString.toUpperCase();
            myout.println(linkAddress);
            myout2.println(ReferenceString.concat(" #"));
            linkAddress="";
            ReferenceString="";
        }
        else
        thisInputLine = thisInputLine.concat(inputLine);
    }
    else
    if (inputLine.indexOf("href=\"")!=-1)
    {
        startAdd=inputLine.indexOf("href=\"");

linkAddress=inputLine.substring(startAdd+6,inputLine.indexOf("\">",startAdd+1));
        if ( (linkAddress.indexOf("://")==-1) && (linkAddress.indexOf("mailto:")==-1) )
            linkAddress = HeadAddress.concat(linkAddress);
        System.out.println(linkAddress);
        if (inputLine.indexOf("</a>")!=-1)
```

```
                        {
    ReferenceString=inputLine.substring(inputLine.lastIndexOf(">",inputLin
    e.lastIndexOf("</a>")-1)+1,inputLine.indexOf("</a>"));
                        System.out.println(ReferenceString);
                        ReferenceString =
    ReferenceString.toUpperCase();
                        myout.println(linkAddress);
                        myout2.println(ReferenceString.concat(" #"));
                        linkAddress="";
                        ReferenceString="";
                        }
                else
                thisInputLine = thisInputLine.concat(inputLine);
                }
            else
            if (inputLine.indexOf("</A>")!=-1)
                {thisInputLine = thisInputLine.concat(inputLine);

ReferenceString=thisInputLine.substring(thisInputLine.lastIndexOf(">",t
    hisInputLine.indexOf("</A>")-1)+1,thisInputLine.indexOf("</A>"));
                    ReferenceString = ReferenceString.toUpperCase();
                myout.println(linkAddress);
                    myout2.println(ReferenceString.concat(" #"));
                thisInputLine="";
                    linkAddress="";
                    ReferenceString="";
                    }
                else
                if (inputLine.indexOf("</a>")!=-1)
                    {thisInputLine = thisInputLine.concat(inputLine);

ReferenceString=thisInputLine.substring(thisInputLine.lastIndexOf(">",t
    hisInputLine.indexOf("</a>")-1)+1,thisInputLine.indexOf("</a>"));
                    ReferenceString = ReferenceString.toUpperCase();
                myout.println(linkAddress);
                    myout2.println(ReferenceString.concat(" #"));
                    thisInputLine="";linkAddress="";
                    ReferenceString="";
                    }
            }
            dis.close();
             myout.println("$");
```

22

```
                myout2.println("$");
                myout2.close();
                    myout.close();
            } catch (MalformedURLException me) {
                System.out.println("MalformedURLException: " + me);
            } catch (IOException ioe) {
                System.out.println("IOException: " + ioe);
            }
        }
        // update previous link variable "oldlink"
        oldlink=link;
        }
      }
    }
--------------------END OF APPENDIX 1 --------------------------------------
```

APPENDIX 2: Modifications to the Speech Recognition System

Brief Description: Modifications done to the components of the speech
recognition system are indicated below.

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Notes: lm_tg_score(w1,w2,w) gives the trigram score.
     lm_bg_score(w1,w) gives the bigram score.
     The following functions boost the scores if
     the word w is in the web triggered word
     set stored in the array thisWordSet[].

All scores are of some type SCORE (typically
     long int).

Typical values for the BoostFactor[]
     entries are 0.1-0.5 and such values
     can also be adapted.

---------------------------------------------------------------

```
SCORE lm_tg_score_boost (int w1 , int w2 , int w3)
{
  int indx;

indx=w3;

if (indx>=_NUM_WORDS) indx=-1;

if (indx==-1) return( (int32) lm_tg_score(w1,w2,w3) );

// if word is not in web-triggered word set then return normal score
  if (!thisWordSet[indx]) return( (int32) lm_tg_score(w1,w2,w3) );

// or else if in web-triggered word set return boosted value
  return ( (int32) BoostFactor[indx]*lm_tg_score(w1,w2,w3) );

} int32 lm_bg_score_boost (int32 w2 , int32 w3)
{
  int indx;
```

```
      indx=w3;

if (indx>=_NUM_WORDS) indx=-1;

5    if  (indx==-1) return( (int32) lm_bg_score(w2,w3) );

if (!thisWordSet[indx]) return( (int32) lm_bg_score(w2,w3) );

10    // If indx is in Web-triggered word set return boosted score.
      return( (int32) BoostFactor[indx]*lm_bg_score(w2,w3) );

}

15
      ------------------------------------------------------------------------
      /*** This is typically executed before the search recognition
           process begins for the current utterance   ***/

20    // Update the latest word set information
      mainboost_NET()
      {
      int i,indx[8];
      FILE *wordsetfile;
25    char ww[40];

OpenLexicon();
      Utterances++;

30    /* The initialization is done currently by two passes over the
      page.Referent
         File; can be altered to one pass ***/

LoadNewPage();
35    /** INITIALIZE EVERYTHING ***/
      for (i=0;i<_NUM_WORDS;i++)
        {
          thisLattWordSet[i]=0;
          thisWordSet[i]=0;
40      }

/** Loading Word Set from Dictionary ***/
      wordsetfile = fopen("page.Referent","r");
      while ( (fscanf(wordsetfile,"%s",ww)!=EOF) && (strcmp(ww,"$")!=0 ) )
```

```
    {
      if (strcmp(ww,"#")==0) continue;
      GetWordIndex(ww,indx);
      for (i=0;i<8;i++)
        if (indx[i]!=-1)
          if (LexiconLen[indx[i]]>0)
          {
            thisWordSet[indx[i]]=1;
            fprintf(debugfp," %s ;",Lexicon[indx[i]]);
          }
      fprintf(debugfp,"\n");
    }
  fclose(wordsetfile);
}

-----------------------------------------------------------------
/** The following routine is for loading the links and referents
    that are updated in the files page.Referent and page.Address
    by the looping JAVA program (Appendix I) ****/ void LoadNewPage()
{
  FILE *wordsetfile, *linkFile;
  char ww[20];
  int i,j,maxindx,mm;
  float max;

/** RELOAD NEW BOOK MARKS ***/
  for (i=0;i<_MAX_LINKS;i++)
    {
      strcpy(LinkWords[i],"");
      strcpy(LinkAddress[i],"");
    }
  i=0;
  wordsetfile = fopen("page.Referent","r");
  linkFile = fopen("page.Address","r");
  while ( (fscanf(wordsetfile,"%s",ww)!=EOF) && (strcmp(ww,"$")!=0 ) )
    {
      fscanf(linkFile,"%s",LinkAddress[i]);
      strcpy(LinkWords[i],"");

while (strcmp(ww,"#")!=0)
        {
          strcat(LinkWords[i]," ");
```

```
          for (mm=0;mm<strlen(ww);mm++)
            if (ww[mm]<'A' || ww[mm]>'Z') ww[mm]=' ';
          strcat(LinkWords[i],ww);
          fscanf(wordsetfile,"%s",ww);
        }
      printf(" LINK: %s ; LINK WORDS: %s
\n",LinkAddress[i],LinkWords[i]);
      i++;
      if (i>=_MAX_LINKS) printf("****ERRR NUM LINKS EXCEEDED
****\n");
    }
    fclose(linkFile); fclose(wordsetfile);
    NUMBER_LINKS=i;

}
```

---

```
/** The following shows what happens at the end of the speech
recognition process when a best sequence output path has been
determined; The appropriate matching home page link (if any)
is found and written out so that the two looping JAVA programs
can automatically ipdate their Web page contexts ****/

/** The input hypstr is the actual best word sequence
    output word string generated by the speech recognition
    search process ***/ void MatchString(hypstr)
char hypstr[];
{
  FILE *wordsetfile, *linkFile;
  char ww[20],dummy[700],dw[100];
  int i,j,maxindx,mm;
  float max;

if (DEMO)
    {
      strcpy(dummy,"");
      strcpy(dw,"");
      while (strcmp(dw,"#")!=0)
        {
          fscanf(demofile,"%s",dw);
          strcat(dummy," ");
```

```
            strcat(dummy,dw);
         }
      strcpy(hypstr,dummy);
   }

/** Load link lists and match and see if anything mathches
    with a hyper link referent/command ***/ for (i=0;i<_MAX_LINKS;i++)
   {
      strcpy(LinkWords[i],"");
      strcpy(LinkAddress[i],"");
   }
i=0;

wordsetfile = fopen("page.Referent","r");
linkFile = fopen("page.Address","r");
   while ( (fscanf(wordsetfile,"%s",ww)!=EOF) && (strcmp(ww,"$")!=0 ) )
      {
        fscanf(linkFile,"%s",LinkAddress[i]);
        strcpy(LinkWords[i],"");

while (strcmp(ww,"#")!=0)
          {
            strcat(LinkWords[i]," ");
            for (mm=0;mm<strlen(ww);mm++)
            if (ww[mm]<'A' || ww[mm]>'Z') ww[mm]=' ';
            strcat(LinkWords[i],ww);
            fscanf(wordsetfile,"%s",ww);
          }
      printf(" LINK: %s ; LINK WORDS: %s
\n",LinkAddress[i],LinkWords[i]);
      i++;
      if (i>=_MAX_LINKS) printf("****ERRR NUM LINKS EXCEEDED
****\n");
   }
fclose(linkFile); fclose(wordsetfile);
NUMBER_LINKS=i;
max=-99999; maxindx=-1;
printf(" ##### HYP %s #########\n",hypstr);
for (i=0;i<NUMBER_LINKS;i++)
   {
     /* String align the hypothesis with all the possible */
     /* link word sequence referents       */
```

```
        align_comp(LinkWords[i],hypstr);
        MatchCorr[i]= (float) 100.00*sent_corr/sent_ref_wds;
        printf(" MATHING WITH %s (%f)
    $$$$$$\n",LinkWords[i],MatchCorr[i]);

/** Find Best Match ****/
        if (MatchCorr[i]> max)
          {
            max = MatchCorr[i];
            maxindx=i;
          }
      }
      if (maxindx==-1) return;

printf(" **CLOSEST MATCH WAS %s (%s) %f
    **\n",LinkWords[maxindx],LinkAddress[maxindx],MatchCorr[maxindx]);

/** If match accuracy/percent correct is greater than a threshold
          then update the appropriate page so as to communicate with
          the looping JAVA programs ****/ if (MatchCorr[maxindx]> THRESHOLD )
        {
        /** SET NEW WEB PAGE CONTEXT ****/
        FILE *pageaddr;
        pageaddr = fopen("/u/www/users/grads/sarukkai/WordLabel.html","w");
        fprintf(pageaddr,"%s",LinkAddress[maxindx]);
        fclose(pageaddr);
        }

}

------------------------END OF APPENDIX 2 ----------------------------
```

APPENDIX 3 -- SOURCE OF EXAMPLE.HTML:
*********************************************************
<APPLET CODE="KeepLoading.class" WIDTH=350 HEIGHT=325>
*********************************************************
The source of the applet KeepLoading.java is as follows:
*************************************************************
</APPLET>

```java
import java.awt.Graphics;
import java.io.*;
import java.net.*;
import java.applet.*;

public class KeepLoading extends java.applet.Applet{

String link="http://www.cs.rochester.edu/u/sarukkai/home.html";
        String oldlink="";
          URL mypage = null;

public void init(){
       // stuff
    } public void paint(Graphics g){
      //stuff

}
        public void start() { while (true)
        {
        URL yahoo = null;
        URL mypage = null ;
        DataInputStream dis=null;

// WordLabel.html is the page that the speech recognizer updates
        // depending on the speech input
            try yahoo = new
 URL("http://www.cs.rochester.edu/u/sarukkai/WordLabel.html");
        catch(Exception e) ;

/******* EXCEPTION OCCURS HERE *****/
```

```
        try dis = new DataInputStream(yahoo.openStream());
        catch(Exception e) ;

try link=dis.readLine();
        catch(Exception e);

if (!link.equals(oldlink)) openpage();
        sleep(1);
        oldlink=link;
        try dis.close(); catch(Exception e)
    System.out.println("Unable to open Input File");

}
        } public void openpage () {
      try mypage = new URL(link);
      catch(Exception e) System.out.println("Wrong URL");
      AppletContext mycon = getAppletContext();
      mycon.showDocument(mypage,"NetSpeak");
       /** System.out.println(link); **/
       }

}
```

------------------------END OF APPENDIX 3 ----------------------------

We claim:

1. A method for user speech actuation of access to information stored in a computer system, the method comprising:

storing the information in a memory of the computer system;

displaying a selected subset of the information via the computer on a display viewable by the user;

forming a web triggered word set from a portion of the information stored in the computer, including a plurality of individual words contained in the displayed subset;

receiving a speech input comprising one or more spoken words from the user;

performing a speech recognition process based on the speech input from the user to determine statistically a set of probable words based on the speech input of the user, including:

processing the input speech in accordance with a set of language/acoustic model and speech recognition search parameters which produce probability scores for at least individual words;

modifying the language/acoustic model and speech recognition search parameters dynamically using the web triggered word set to boost the probability score of at least individual ones of the probable words; and updating the display to display a new subset of the information in accordance with the set of probable words determined from the speech recognition search as modified using the web-triggered word set.

2. A method according to claim 1 in which the computer system includes a local computer operable by the user, a remote computer at which the information is stored and a network link for coupling the local and remote computers, the displaying step including accessing the information from the local computer via a web browser.

3. A method according to claim 1 in which the information is stored in a hypertext markup language (HTML) source document and the step of forming a web triggered word set includes forming a set of words that includes a source word set including individual words extracted from the (HTML) source document.

4. A method according to claim 1 in which the step of forming a web triggered word set includes storing in a short term cache one or more previously-formed web triggered word sets for inclusion in a current web triggered word set.

5. A method according to claim 1 in which the step of forming a web triggered word set includes modifying the web triggered word set responsive to updating to display a new subset of the information.

6. A method according to claim 1 in which the step of forming a web triggered word set includes forming a set of words that includes words selected from at least one of a displayed subset of the information and a basic word set of command and function words chosen a priori.

7. A method according to claim 1 in which the step of performing a speech recognition process which includes the processing and modifying steps includes estimating a fit between an acoustic observation X of the speech input word sequence and a possible word sequence W according to a Bayes-type evaluation function $F(S_{LM}(W|H), S_{AC}(X|W,H))$, where
$S_{LM}$ is a language model score,
$S_{Ac}$ is an acoustic model score, and
H is the web triggered word set.

8. A method according to claim 1 in which the step of performing a speech recognition process which includes the processing and modifying steps includes estimating a fit between an acoustic observation X of the speech input word sequence and a possible word sequence W according to an altered Bayes-like scoring function $Pr(X|W) \times Pr(W)^{Omega(W,H)}$ using a special set of Omega(W,H) values for words W belonging to a predicted/web-triggered set H, so as to improve the scores of such words.

9. A computer system for user speech actuation of access to stored information, the system comprising:

a computer including a central processing unit, a memory and a user input/output interface including a microphone for input of user speech utterances and audible sound signal processing circuitry;

means for accessing and storing information in the memory of the computer system;

a speech recognition processor operating on the computer system for recognizing words including individual words based on the input speech utterances of the user in accordance with a set of language/acoustic model and speech recognition search parameters which produce a probability score for at least the individual words;

means for forming a web triggered word set from a selected subset of information in the document, the web triggered word set including a plurality of individual words contained in the displayed subset;

means for modifying the language/acoustic model and speech recognition search parameters dynamically using the web triggered word set to boost the probability score of at least the individual words; and means responsive to the speech recognition processor for generating a word string based on the probability score as boosted by the modifying means for input to the accessing and storing means to initiate a change in the information accessed.

10. A system according to claim 9 including:

means for displaying a first portion of the selected subset of the information via the computer on a display viewable by the user, so that the user can formulate speech utterances based on the displayed portion of the information; and means for updating the display to show a second portion of the selected subset of the information in accordance with the word string determined from the speech recognition search.

11. A system according to claim 9 in which the information stored in the memory comprises a first document and the accessing and storing means includes means for directing the system to access a different document responsive to the word string.

12. A method according to claim 9 in which the computer system includes a local computer operable by the user, a remote computer at which the information is stored and a network link for coupling the local and remote computers, the displaying means including means for accessing the information from the local computer via a web browser.

* * * * *